United States Patent [19]

Bodo

[11] Patent Number: 5,777,811
[45] Date of Patent: Jul. 7, 1998

[54] DIGITAL DATA DUPLICATING SYSTEM

[75] Inventor: Martin J. Bodo, Mountain View, Calif.

[73] Assignee: Computer Performance, Inc., Santa Clara, Calif.

[21] Appl. No.: 680,640

[22] Filed: Jul. 17, 1996

[51] Int. Cl.$^6$ .................................................. G11B 5/86
[52] U.S. Cl. .............................................................. 360/15
[58] Field of Search ............................. 360/15, 13, 61, 360/53, 27, 48, 60, 71; 369/84, 83

[56] References Cited

U.S. PATENT DOCUMENTS

| | | | |
|---|---|---|---|
| 4,375,655 | 3/1983 | Korth et al. | 360/15 |
| 4,707,750 | 11/1987 | Anderson et al. | 300/15 |
| 4,725,899 | 2/1988 | Gardner | 360/15 |
| 5,375,017 | 12/1994 | Kawai et al. | 360/15 |
| 5,426,534 | 6/1995 | Nakata et al. | 360/15 |
| 5,428,453 | 6/1995 | Ido et al. | 360/15 |

*Primary Examiner*—Tan Dinh
*Attorney, Agent, or Firm*—Donald E. Schreiber

[57] ABSTRACT

A data-duplicating system for copying digital data between information storage device that occupies a mounting space sized to receive a standard, 5¼ inch, half-height Winchester hard disk drive. The data duplicating system includes different types of information-storage-device connectors adapted for coupling to the data-duplicating system information storage devices that conform to various disparate, incompatible interface specifications. The electronic circuit also includes a digital logic circuit for reading digital data from a first information storage device and writing the read digital data to one or more other information storage devices. A high-speed serial-port permits coupling together a pair of data-duplicating systems. A plurality of switches and a liquid crystal display ("LCD") permit an operator to control the data-duplicating system.

27 Claims, 5 Drawing Sheets

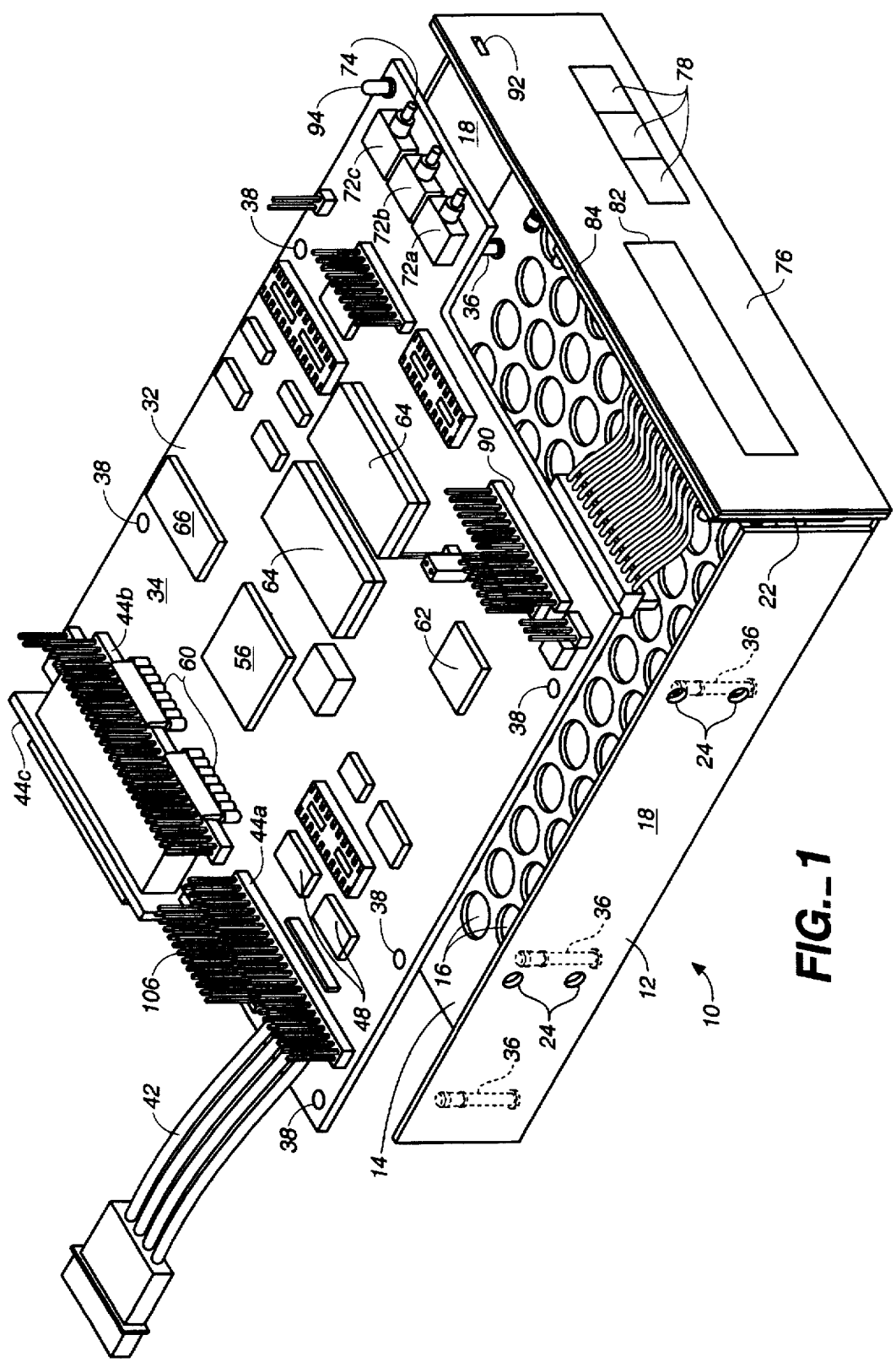
FIG._1

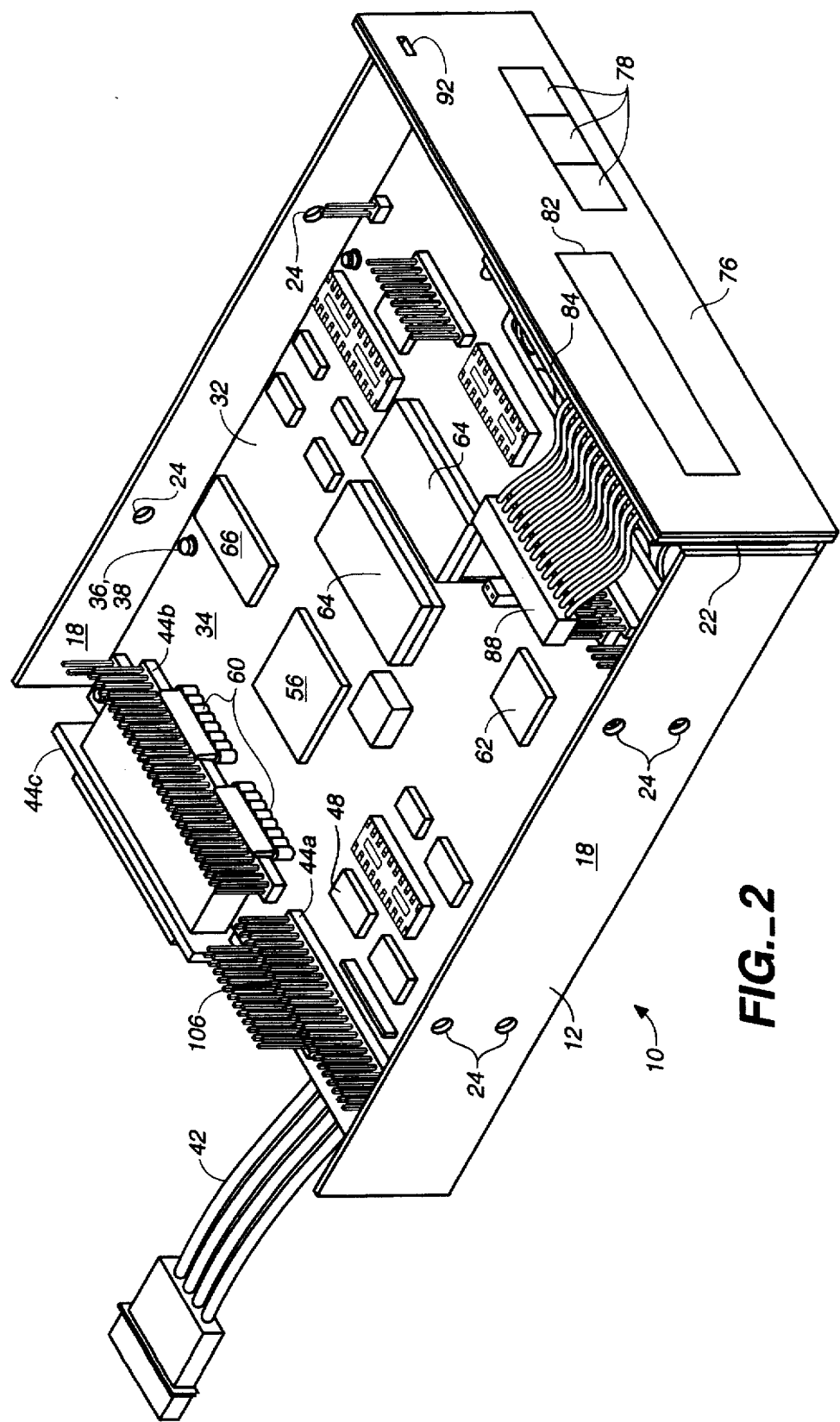
FIG._2

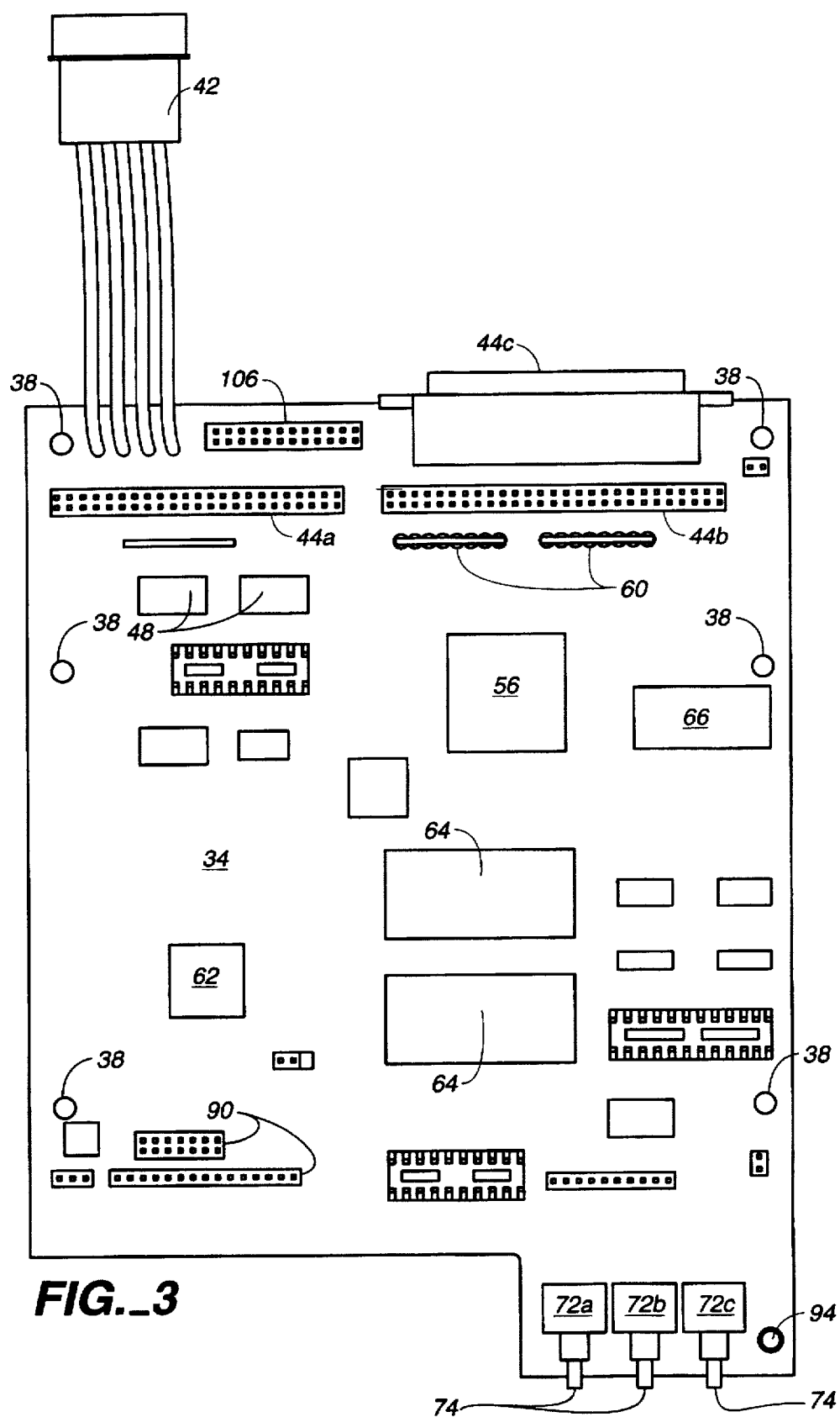
FIG._3

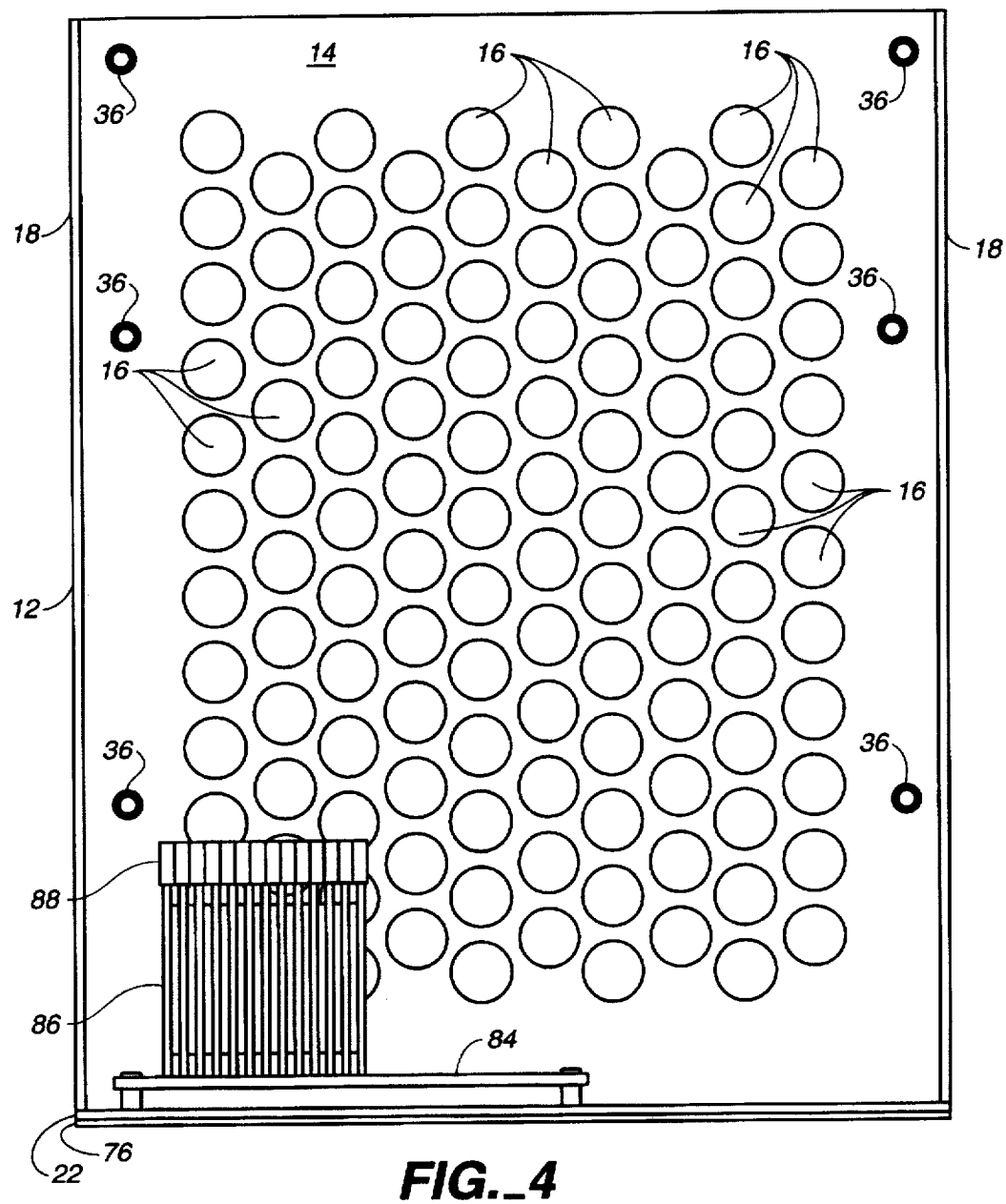
FIG._4
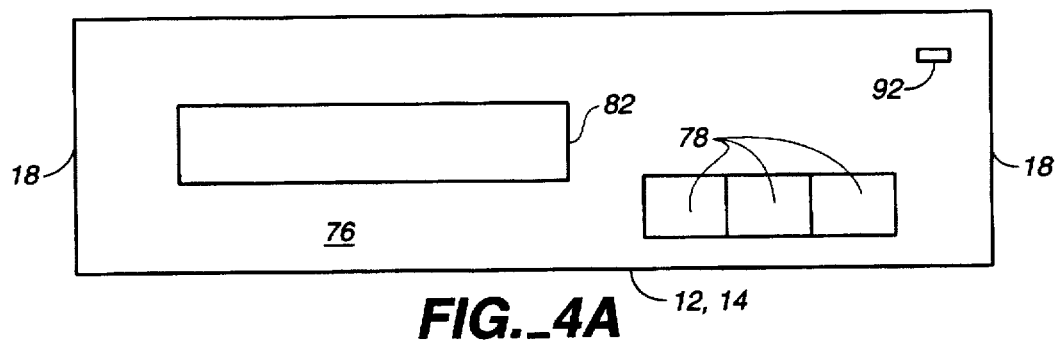
FIG._4A

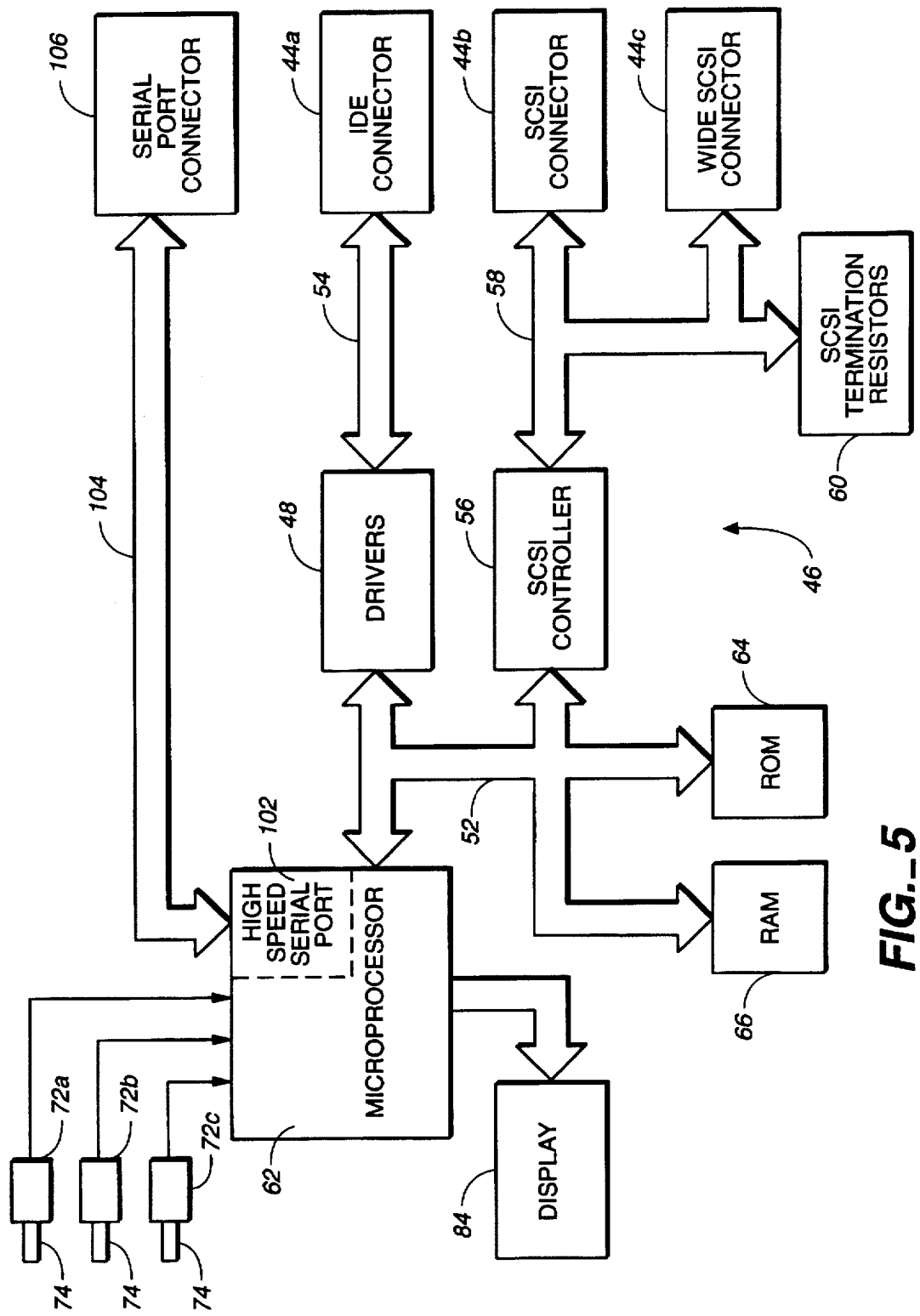
FIG._5

5,777,811

DIGITAL DATA DUPLICATING SYSTEM

BACKGROUND OF THE INVENTION

1. Field of the Invention

The present invention relates generally to information storage devices used with digital computers and, more particularly, to systems for making duplicate copies of digital data stored on such information storage devices.

2. Description of the Prior Art

Hard disk drive information storage devices used in digital computers store voluminous amounts of information at an affordable cost. Consequently, the amount of data stored on such devices, in the forms both of computer programs and of data processed by computer programs, increases continuously. Frequently, purchasers of new digital computers receive a significant number of computer programs pre-recorded on hard disk drive information storage device included in the computers. Installing such software onto a hard disk drive from distribution media, either floppy diskettes or CD-ROMS, is time consuming. Therefore, prior to delivery individuals assembling such computer systems employ various techniques to either automate, as much as possible, software installation, or they merely copy software recorded on a hard disk drive installed in one computer onto a hard disk drive installed in the new computer. Either of these techniques for duplicating digital data present on a hard disk are relatively inefficient and cumbersome.

Another type of storage device which also stores a significant amount of digital information is a compact disk read only memory ("CD-ROM"). Present CD-ROMs store more than 600 Megabytes of digital data, while a recently developed enhancement of CD-ROM technology, i.e. digital video disk ("DVD"), stores approximately ten times that amount of data. Traditional CD-ROM manufacture employs an injection molding process to mechanically duplicate a master CD-ROM. Injection molding is very cost effective for large volume CD-ROM duplication, e.g. tens of thousands of identical CD-ROMs. However, injection molding CD-ROM duplication is comparatively cumbersome, expensive and slow if only ten to one-hundred CD-ROMs are to be produced. For small volume CD-ROM duplication it is therefore faster and more cost effective to use recordable CD-ROM technology, instead of injection molding, for CD-ROM duplication. Unfortunately, the problems which attend hard disk drive duplication described above also attend CD-ROM duplication using recordable CD-ROMs.

In addition to the procedural and temporal problems that attend duplicating voluminous amounts of digital data by copying such data from one information storage device to another, logistical difficulties also exist. For example, presently available information storage devices operate in accordance with one of several different incompatible interface specifications. Examples of such interface specifications are an Integrated Drive Electronics ("IDE") specification, an original Small Computer System Interface ("SCSI-I") specification, and a more recent Small Computer System Interface ("SCSI-II") specification. Each of these different interface specifications may employ physically different hardware, e.g. cable, for coupling an information storage device to the remainder of the digital computer, different types of electrical signals, and/or different signaling protocols. Consequently, an apparently mundane task of copying a voluminous amount of digital data from one information storage device to another information storage device actually requires a significant amount of advance planning and procurement to insure availability of all necessary hardware followed by a significant amount of time and attention during digital data duplication.

SUMMARY OF THE INVENTION

An object of the present invention is to provide a system for efficiently copying voluminous amounts of digital data from one information storage device to another information storage device.

Another object of the present invention is to provide a physically compact system for copying voluminous amounts of digital data from one information storage device to another information storage device.

Another object of the present invention is to provide a simple system for copying voluminous amounts of digital data from one information storage device to another information storage device.

Another object of the present invention is to provide a flexible system for copying voluminous amounts of digital data from one information storage device to another information storage device.

Another object of the present invention is to provide a facile system for copying voluminous amounts of digital data from one information storage device to another information storage device.

Briefly, the present invention is a data-duplicating system for copying digital data from a first information storage device to a second information storage device that is adapted for mounting in a space sized to receive a standard, 5¼ inch, half-height Winchester hard disk drive. The data-duplicating system includes a tray-shaped chassis having opposing side walls that are spanned at one end by a front panel. The chassis has overall dimensions no larger than overall dimensions of the standard size, 5¼ inch, half-height Winchester hard disk drive, and the chassis' side walls respectively include means for mechanically securing the data-duplicating system within such a space.

The data-duplicating system further includes an electronic circuit that is mechanically secured within the chassis. The electronic circuit includes an electrical-power connector for supplying electrical power to the electronic circuit. To connect information storage devices to the data-duplicating system, the electronic circuit includes a first-information-storage-device connector and a second-information-storage-device connector. The electronic circuit also includes a digital logic circuit for reading digital data from the first information storage device and writing the read digital data to the second information storage device. The electronic circuit also includes a plurality of switches, located adjacent to the front panel of the chassis, that permit operator control of the digital logic circuit for reading data from one information storage device and writing the read data to another information storage device.

The data-duplicating system also includes a display, such as a liquid crystal display ("LCD"), that is coupled to the electronic circuit. The display, which is visible through the front panel of the chassis, presents a visible status display indicating operation of the data-duplicating system for copying data from one information storage device to another information storage device.

Preferably, the first-information-storage-device connector and a second-information-storage-device connector permit coupling information storage devices which conform to different, incompatible interface specifications to the electronic circuit.

3

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 1 is a perspective view depicting assembly of a printed circuit board ("PCB") into a chassis to form a data-duplicating system in accordance with the present invention;

FIG. 2 is a perspective view of an assembled data-duplicating system of FIG. 1 including the PCB and the chassis;

FIG. 3 is a plan view depicting the PCB of the data-duplicating system illustrated FIGS. 1 and 2;

FIG. 4 is a plan view depicting the chassis of the data-duplicating system illustrated in FIGS. 1 and 2;

FIG. 4A front elevational view depicting a front panel included in the chassis illustrated in FIGS. 1, 2 and 4; and FIG. 5 is a block diagram depicting an electronic circuit of the data-duplicating system provided by the PCB depicted in FIGS. 1, 2 and 3.

DETAILED DESCRIPTION OF THE PREFERRED EMBODIMENT

FIGS. 1 and 2 depict a digital-data duplicating-system in accordance with the present invention referred to by the general reference character 10. The data-duplicating system 10 includes a tray-shaped chassis 12 which has a bottom wall 14, that is pierced by a plurality of apertures 16, above which opposing side walls 18 project. A front panel 22, which also projects upward from the bottom wall 14, spans one end of the side walls 18. The chassis 12 has overall dimensions, i.e. length, width and height, the same as overall dimensions of a standard size, 5¼ inch, half-height Winchester hard disk drive. The side walls 18 respectively includes threaded apertures 24 for mechanically securing the data-duplicating system 10 within such a space.

The data-duplicating system 10 also includes an electronic circuit 32, preferably assembled on a printed circuit board ("PCB") 34 as depicted in FIGS. 1 and 2. The PCB 34 is mechanically secured within the chassis 12 by a plurality of posts 36 that project upward from the bottom wall 14 and engage apertures 38 which pierce the PCB 34. The electronic circuit 32 includes an electrical-power connector 42 for supplying electrical power to the electronic circuit 32. The electronic circuit 32 also includes three information-storage-device connectors 44a, 44b and 44c. Each of the information-storage-device connectors 44a, 44b and 44c may respectively couple an information storage device (not depicted in any of the FIGS.) to the electronic circuit 32. Specifically, the information-storage-device connector 44a is adapted for coupling an information storage device that operates in accordance with the Integrated Drive Electronics ("IDE") specification. The information-storage-device connector 44b is adapted for coupling an information storage device that operates in accordance with the original Small Computer System Interface ("SCSI-I") specification. The information-storage-device connector 44c is adapted for coupling an information storage device that operates in accordance with the more recent Small Computer System Interface ("SCSI-II") specification.

The electronic circuit 32 also includes a digital logic circuit 46 illustrated in FIG. 5. The digital logic circuit 46 includes a set of drivers 48 that exchange electrical signals between a digital logic circuit bus 52 and an IDE bus 54 which connects to the IDE information-storage-device connector 44a. The digital logic circuit 46 also includes a SCSI controller 56 which exchanges electrical signals between a digital logic circuit bus 52 and a SCSI bus 58. Both the SCSI-I information-storage-device connector 44b and the wide SCSI-II information-storage-device connector 44c connect to the SCSI bus 58. The electronic circuit 32 also includes SCSI termination resistors 60 which connect to the SCSI bus 58 in accordance with the Small Computer System Interface ("SCSI") specifications.

A microprocessor 62, which also connects to the digital logic circuit bus 52, executes a computer program that is stored in a read only memory ("ROM") 64. Execution of the computer program by the microprocessor 62 effects copying of digital data from one information storage device to another information storage device. The computer program executed by the microprocessor 62 is conventional, and may be readily implemented by one of ordinary skill in the art of programming the microprocessor 62 for reading digital data from and writing digital data to information storage devices. In copying digital data from one information storage device to another, a random access memory ("RAM") 66 receives digital data read from one information storage device, and supplies such digital data for writing to the other information storage device.

The microprocessor 62 is preferably an AM186EM manufactured by Advanced Micro Devices of Sunnyvale, Calif. The ROM 64 preferably stores 512 KBytes of computer program, and the RAM 66 preferably stores 512 KBytes of digital data. The SCSI controller 56 is preferably a M86603 marketed by Fujitsu Microelectronics, Inc. of San Jose, Calif.

The electronic circuit 32 also includes three push-button switches 72a, 72b and 72c that are respectively coupled to the microprocessor 62. As illustrated in FIGS. 1 and 2, installation of the PCB 34 into the chassis 12 juxtaposes the push-button switches 72a, 72b and 72c with front panel 22. The front panel 22 has push-button apertures formed therethrough (not illustrated in any of the FIGS.) into which a switch actuator 74 of each of the push-button switches 72a, 72b and 72c respectively extends. The front panel 22 of the chassis 12 includes an overlay 76 of flexible material that covers the push-button apertures. Three rectangularly-shaped areas 78 are embossed onto the overlay 76 to indicate where finger pressure should be applied to the overlay 76 so it yields and presses on the appropriate one of the switch actuators 74 for operating one of the push-button switches 72a, 72b and 72c.

In addition to apertures for the switch actuators 74 of the push-button switches 72a, 72b and 72c, the front panel 22 is also pierced by a larger rectangularly-shaped aperture 82 best illustrated in FIG. 4A. A liquid crystal display ("LCD") 84 depicted in FIG. 4, that is secured to the front panel 22 adjacent to the rectangularly-shaped aperture 82, provides a display consisting of two (2) rows of twenty (20) characters. The LCD 84 includes a ribbon cable 86 and a connector 88 for coupling the LCD 84 to a display connector 90 included on the PCB 34. Information presented on the LCD 84 by the computer program executed by the microprocessor 62 concerning operation of the data-duplicating system 10 for copying digital data between information storage devices is visible to an operator through the rectangularly-shaped aperture 82. A small rectangularly-shaped aperture 92 also pierces the front panel 22. Installation of the PCB 34 into the chassis 12 disposes a light emitting diode ("LED") 94 mounted on the PCB 34 immediately adjacent to the rectangularly-shaped aperture 92. Illumination of the LED 94, which is visible to an operator through the rectangularly-shaped aperture 92, indicates that the electronic circuit 32 is being supplied with electrical power.

As illustrated in FIG. 5, the preferred microprocessor 62 of the electronic circuit 32 includes a high-speed serial-port 102 that exchanges electrical signals with a serial-port bus 104. A serial-port connector 106, mounted on the PCB 34, connects to the serial-port bus 104 and receives a plug of a serial cable, that are not depicted in any of the FIGs. The high-speed serial-port 102, the serial-port bus 104 and the serial-port connector 106, together with an appropriate adaptation of the computer program executed by the microprocessor 62, permit interconnecting a pair of digital-data duplicating-systems 10. Interconnecting a pair of digital-data duplicating-systems 10 permits copying digital data from an information storage device connected to one of the digital-data duplicating-systems 10 to one or more information storage devices connected to the other data-duplicating system 10.

An operator of the data-duplicating system 10 initiates duplication of digital data by appropriately pressing the pushbutton switches 72a, 72b and 72c. Pressing the pushbutton switch 72a causes the computer program to step through entries in a selection menu which the computer program presents on the LCD 84. When a desired menu entry appears on the LCD 84, the operator presses the push-button switch 72b to select that menu entry. Pressing the push-button switch 72c resets the data-duplicating system 10. After the data-duplicating system 10 commences digital data duplication, the computer program executed by the microprocessor 62 presents status information about the copying operation on the LCD 84.

The information-storage-device connectors 44a, 44b and 44c permit various alternatives for coupling information storage devices to the data-duplicating system 10. As is readily recognized by those skilled in the art, at least two (2) information storage devices that conform to the IDE specification may be connected to the IDE information-storage-device connector 44a. Similarly, up to seven (7) information storage devices, that conform either to the SCSI-I specification or to the SCSI-II specification, may be connected to the combined SCSI-I informationstorage-device connector 44b and wide SCSI-II information-storage-device connector 44c. The data-duplicating system 10 may copy digital data present on an information storage device coupled to any of the information-storage-device connectors 44a, 44b and 44c to any or to all other information storage devices connected to the information-storage-device connectors 44a, 44b and 44c. Moreover, the data-duplicating system 10 may record multiple copies of the same digital data concurrently on combinations of up to fifteen (15) information storage devices connected to the information-storage-device connectors 44a, 44b and 44c.

To obtain characteristic data for information storage devices, e.g. data storage capacity, that is required for properly reading or writing digital data, the computer program executed by the microprocessor 62 interrogates the information storage devices which report their characteristics to the computer program. Analogously, the computer program executed by the microprocessor 62 scans the IDE bus 54 and the SCSI bus 58 to determine where and how many information storage devices are concurrently connected to the data-duplicating system 10. The computer program then uses that information in presenting an operator with a menu that permits selecting the information storage devices from which digital data is to be read, and the information storage device(s) to which that digital data will be written.

While the data-duplicating system 10 permits copying digital data between information storage devices that conform to different, incompatible interface specifications by respectively coupling such information storage devices to an appropriate one of the information-storage-device connectors 44a, 44b and 44c, the data-duplicating system 10 also permits copying digital data between a pair of information storage devices that both conform to the same interface specification. Accordingly, such a pair of information storage devices may both be coupled to the IDE information-storage-device connector 44a, both be coupled to the SCSI-I information-storage-device connector 44b, or both be coupled to the wide SCSI-II information-storage-device connector 44c.

Although the present invention has been described in terms of the presently preferred embodiment, it is to be understood that such disclosure is purely illustrative and is not to be interpreted as limiting. For example, it is readily apparent that the electronic circuit 32 may include more than the three (3) information-storage-device connectors 44a, 44b and 44c, and/or that the information-storage-device connectors 44a, 44b and 44c may be adapted for coupling to the data-duplicating system 10 information storage devices other than those which conform to the IDE, SCSI-I and wide SCSI-II specifications. It is also readily apparent from FIGS. 1, 2 and 3 that interface specifications which utilize physically smaller connectors would permit assembling a physically more compact data-duplicating system 10. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A first data-duplicating system for copying digital data from a first information storage device to a second information storage device, the data-duplicating system being adapted for mounting in a space no larger than that required for a 5¼ inch, half-height Winchester hard disk drive, the data-duplicating system comprising:

a tray-shaped chassis having opposing side walls that are spanned at one end by a front panel, said chassis having overall dimensions no larger than overall dimensions of the 5¼ inch, half-height Winchester hard disk drive, the side walls respectively including means for mechanically securing the data-duplicating system within such a space;

an electronic circuit, mechanically secured within said chassis, that includes an electrical-power connector for supplying electrical power to said electronic circuit, a first-information-storage-device connector for coupling the first information storage device to said electronic circuit, a second-information-storage-device connector for coupling the second information storage device to said electronic circuit, said electronic circuit also including a digital logic circuit for reading digital data from the first information storage device and writing the read digital data to the second information storage device, and a plurality of switches, juxtaposed with the front panel of said chassis, that permit operator control of the digital logic circuit for reading digital data from the first information storage device and writing the read digital data to the second information storage device; and a display, that is coupled to said electronic circuit and is visible through the front panel of said chassis, for presenting a visible status display indicating operation of said data-duplicating system for copying digital data from the first information storage device to the second information storage device.

2. The data-duplicating system of claim 1 wherein the means for mechanically securing the data-duplicating system within the space sized to receive the 5¼ inch, half-height Winchester hard disk drive includes threaded apertures formed into the side walls of said chassis.

3. The data-duplicating system of claim 1 wherein the electronic circuit includes a printed circuit board ("PCB") on which are mounted the first-information-storage-device connector, the second-information-storage-device connector, the digital logic circuit, and the switches.

4. The data-duplicating system of claim 1 wherein the first-information-storage-device connector permits coupling to the electronic circuit of the first information storage device which conforms to a first interface specification, and the second-information-storage-device connector permits coupling to the electronic circuit of the second information storage device which conforms to a second interface specification that differs from the first interface specification.

5. The data-duplicating system of claim 4 wherein the first interface specification is an Integrated Drive Electronics ("IDE") specification, and the second interface specification is an original Small Computer System Interface ("SCSI-I") specification.

6. The data-duplicating system of claim 4 wherein the first interface specification is an IDE specification, and the second interface specification is a wide Small Computer System Interface ("SCSI-II") specification.

7. The data-duplicating system of claim 4 wherein the first interface specification is a SCSI-I specification, and the second interface specification is a wide SCSI-II specification.

8. The data-duplicating system of claim 1 wherein the first information storage device conforms to an interface specification, the second information storage device conform to an interface specification which is the same as that to which the first information storage device conforms, and the first information storage device and the second information storage device both being coupleable to said electronic circuit by the first-information-storage-device connector.

9. The data-duplicating system of claim 1 wherein the switches are push-button switches, the front panel of the chassis has push-button apertures formed therethrough into which a switch actuator of each push-button switch respectively extends, and the front panel of said chassis includes a overlay of flexible material that covers the push-button apertures, and that yields to pressure applied to said overlay for operating the switch actuators.

10. The data-duplicating system of claim 1 wherein the display is a liquid crystal display ("LCD"), and the front panel of the chassis has an LCD aperture formed therethrough through which the LCD is visible.

11. The data-duplicating system of claim 1 wherein said electronic circuit further includes an electrical-power indicator, and the front panel of the chassis has an electrical-powerindicator aperture formed therethrough through which said electrical-power indicator is visible.

12. The data-duplicating system of claim 11 wherein the electric al-power indicator is a light emitting d iode ("LED").

13. The data-duplicating system of claim 1 wherein said digital logic circuit includes a microprocessor that executes a computer program for copying digital data from the first information storage device to the second information storage device, a read only memory ("ROM") for storing the computer program executed by the microprocessor, and a random access memory ("RAM") for receiving digital data read from the first information storage device, and f or supplying such digital data fo r writing to the second information storage device.

14. The data-duplicating system of claim 1 wherein said digital logic circuit includes a high-speed serial-port adapted for coupling the data-duplicating system to a second data-duplicating system.

15. A first data-duplicating system for copying digital data from a first information storage device to a second information storage device, the data-duplicating system comprising:

an electronic circuit, that includes an electrical-power connector for supplying electrical power to said electronic circuit, a first-information-storage-device connector for coupling the first information storage device to said electronic circuit, a second-information-storage-device connector for coupling the second information storage device to said electronic circuit, said electronic circuit also including a digital logic circuit for reading digital data from the first information storage device and writing the read digital data to the second information storage device, and a plurality of switches, that permit operator control of the digital logic circuit for reading digital data from the first information storage device and writing the read digital data to the second information storage device; and a display, that is coupled to said electronic circuit, for presenting a visible status display indicating operation of said data-duplicating system for copying digital data from the first information storage device to the second information storage device.

16. The data-duplicating system of claim 15 wherein the electronic circuit includes a printed circuit board PCB on which are mounted the first-information-storage-device connector, the second-information-storage-device connector, the digital logic circuit, and the switches.

17. The data-duplicating system of claim 15 wherein the first-information-storage-device connector permits coupling to the electronic circuit of the first information storage device which conforms to a first interface specification, and the secondinformation-storage-device connector permits coupling to the electronic circuit of the second information storage device which conforms to a second interface specification that differs from the first interface specification.

18. The data-duplicating system of claim 17 wherein the first interface specification is an IDE specification, and the second interface specification is a SCSI-I specification.

19. The data-duplicating system of claim 17 wherein the first interface specification is an IDE specification, and the second interface specification is a wide SCSI-II specification.

20. The data-duplicating system of claim 17 wherein the first interface specification is a SCSI-I specification, and the second interface specification is a wide SCSI-II specification.

21. The data-duplicating system of claim 15 wherein the first information storage device conforms to an interface specification, the second information storage device conform to an interface specification which is the same as that to which the first information storage device conforms, and the first information storage device and the second information storage device both being coupleable to said electronic circuit by the first-information-storage-device connector.

22. The data-duplicating system of claim 15 wherein the switches are push-button switches.

23. The data-duplicating system of claim 15 wherein the display is a LCD.

24. The data-duplicating system of claim 15 wherein said electronic circuit further includes an electrical-power indicator.

25. The data-duplicating system of claim 24 wherein the electrical-power indicator is a LED.

26. The data-duplicating system of claim 15 wherein said digital logic circuit includes a microprocessor that executes a computer program for copying digital data from the first information storage device to the second information storage device, a ROM for storing the computer program executed by the microprocessor, and a RAM for receiving digital data read from the first information storage device, and for supplying such digital data for writing to the second information storage device.

27. The data-duplicating system of claim 15 wherein said digital logic circuit includes a high-speed serial-port adapted for coupling the data-duplicating system to a second data-duplicating system.

\* \* \* \* \*